United States Patent [19]

Haraguchi

[11] Patent Number: 4,783,671
[45] Date of Patent: Nov. 8, 1988

[54] FILM INFORMATION READING DEVICE FOR CAMERA

[75] Inventor: Shosuke Haraguchi, Kanagawa, Japan

[73] Assignee: Canon Kabushiki Kaisha, Tokyo, Japan

[21] Appl. No.: 18,081

[22] Filed: Feb. 24, 1987

[30] Foreign Application Priority Data

Feb. 26, 1986 [JP] Japan .............................. 61-025661[U]
Feb. 26, 1986 [JP] Japan .............................. 61-025662[U]

[51] Int. Cl.⁴ ................................................ G03B 7/24
[52] U.S. Cl. ......................................................... 354/21
[58] Field of Search ............................................ 354/21

[56] References Cited

U.S. PATENT DOCUMENTS 4,582,408 4/1986 Miki et al. ............................ 354/21

Primary Examiner—Michael L. Gellner
Attorney, Agent, or Firm—Fitzpatrick, Cella, Harper & Scinto

[57] ABSTRACT

A film information reading device for a camera includes contact members arranged to make contact with an information pattern formed on an outside peripheral surface of a film cartridge to read out an information concerning a film contained in the film cartridge. Each of the contact members has an annular shaped contact surface.

13 Claims, 3 Drawing Sheets 4,783,671

FILM INFORMATION READING DEVICE FOR CAMERA

BACKGROUND OF THE INVENTION

1. Field of the Invention

The present invention relates to a film information reading device for a camera and, more particularly, it relates to a film information reading device arranged to read an information pattern concerning a film formed on an outside peripheral surface of a film cartridge containing said film.

2. Description of the Related Art

As shown in FIG. 5, a film cartridge 1 has an information pattern 2 on its outside peripheral surface.

In order to read such information pattern, two types of film information reading devices have been heretofore employed. One of them includes one contact member per one pattern, while the other includes two contact members per one pattern.

The usual information pattern formed on the film cartridge is constructed to indicate the information by detecting a conductive or non-conductive state of the pattern relative to a standard pattern. However, where the film information reading device is of the one contact member per one pattern type, it is difficult to effect reliable detection of the conductive or non-conductive state, owing to the unstable condition of the surface of the information pattern and, consequently, it is difficult to perform precise reading of the information.

For the reasons described above, the device of the one contact member per one pattern type lacks reliability in reading of information. The device of the two contact members per one pattern type has been proposed, with the object of improving the reliability in information reading and such a device is disclosed, for example, in U.S. Pat. No. 4,582,408 or U.S. Pat. Ser. No. 783,847. However, the device of the two contact members per one pattern type requires two independent contact mechanisms, so that efficiency of assembling it is low and manufacturing cost is high. Furthermore, in the device including two independent contact members, there is a limitation in the pitch of the contact members and there is also the danger of the contact member coming into contact with an incorrect pattern portion, owing to an accidental shifting of the film cartridge.

In the conventional construction of the film information reading device, the contact member in the form of a cap is movably supported and energized by an electrically conductive spring, which contacts, at its opposite ends, with the contact member and a pattern portion of a flexible printed circuit board, respectively. In such a conventional construction, direct contact is formed between the end of the contact member and the pattern portion of the flexible printed circuit board, so that there is a danger that the contact member may damage the pattern portion of the flexible printed circuit board.

SUMMARY OF THE INVENTION

In accordance with an aspect of the present invention there is provided a film information reading device for reading an information pattern formed on an outside peripheral surface of a film cartridge, comprising at least one contact member arranged to make contact with the information pattern formed on the outside peripheral surface of the film cartridge, the contact member having an annular projection at its contact surface.

According to the above described construction, it is possible to be assured of a two-point contact between the information pattern and the contact member, at any time, even if there is an error causing factor, such as tilting of the film cartridge, or incomplete contact owing to an unstable condition of the surface of the information pattern. Consequently the reliability in transmission of information is considerably improved.

In accordance with another aspect of the present invention, there is provided a film information reading device of the type in which a contact member in the form of a cap is used and a spring is arranged in the contact member to electrically connect said contact member with a flexible printed circuit board through the spring, comprising a contact preventing member for preventing the end of the contact member from making direct contact with the flexible printed circuit board. This feature prevents the flexible printed circuit board from being damaged owing to the direct contact of the contact member with the flexible printed circuit board.

Other features and objects of the present invention will be understood from the description of the preferred embodiments of the invention which will be made with reference to the accompanying drawings.

BRIEF DESCRIPTION OF THE DRAWINGS

FIGS. 2a and 2b illustrate the state of contact between the contact member and the film cartridge which has been loaded into the camera, in which FIG. 2a is a cross-sectional view and FIG. 2b is a sectional view taken along a line A—A in FIG. 2a.

DETAILED DESCRIPTION OF THE PREFERRED EMBODIMENT

Figure 1:
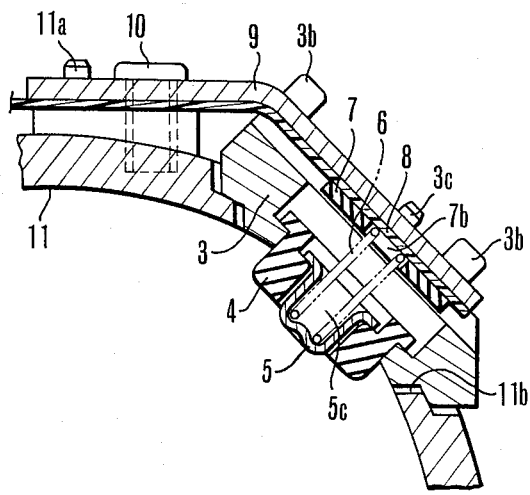
FIG. 1 is a sectional view showing an essential part of an embodiment of the film information reading device according to the present invention, in which a film cartridge has not been loaded into the camera.

A preferred embodiment of the present invention will be described with reference to FIGS. 1-4.

The film information reading device includes a holding frame 3, a contact holding member 4, contact members 5, springs 6, a spring restraining member 7, a flexible printed circuit board 8 and a holding plate 9. These elements are constructed as a unit.

Figure 4:
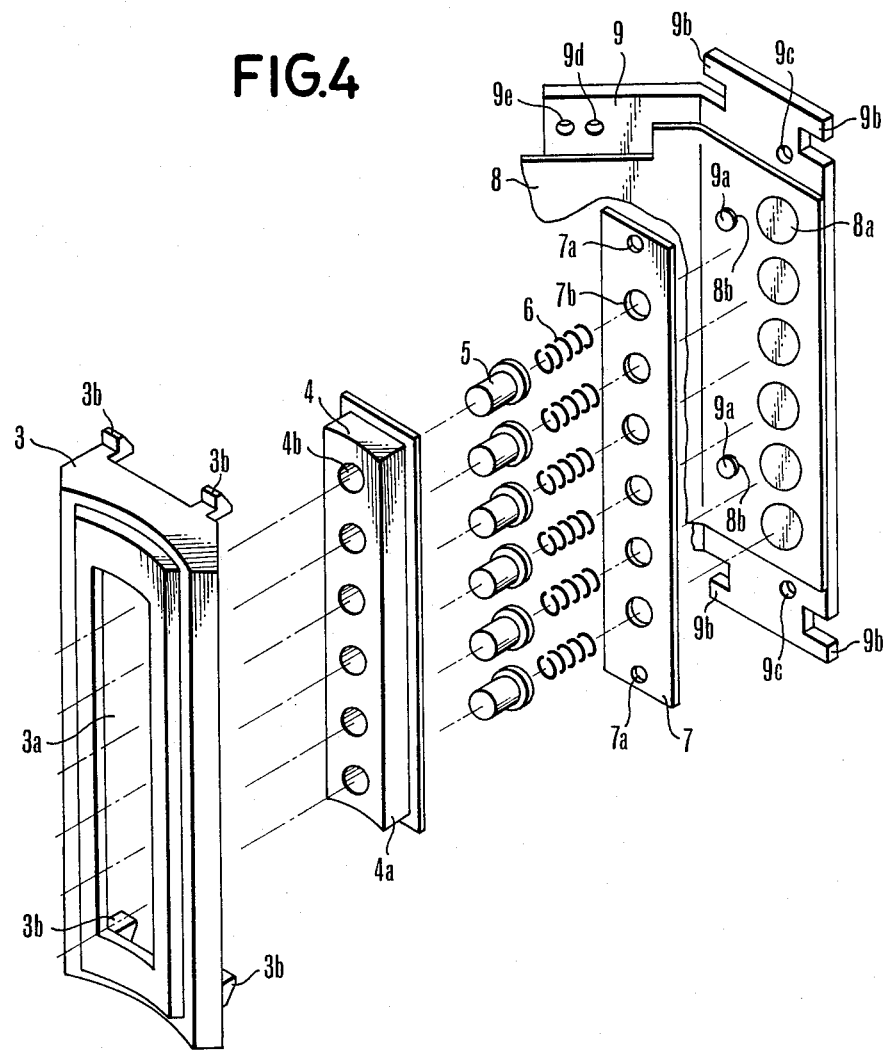
FIG. 4 is an exploded perspective view showing the film information reading device according to the present invention.

Holding frame 3 has an inside wall which is formed in an arcuate shape corresponding to an inside surface of a cartridge chamber of a camera body 11. The holding frame 3 has an opening 3a in the middle part thereof which slidably receives a contact holding part 4a of the contact holding member 4. The holding frame 3 has engaging projections 3b formed at the outer sides of the four corners thereof and further has positioning bosses 3c formed at the upper and lower sides thereof. Contact holding member 4 is made of electrical insulating material and has a plurality of holes 4b (six holes in the embodiment as shown in FIG. 4,) for holding the contact members which are arranged in a line. Each of the contact members 5 is in the form of a cap which is made by drawing of a metallic plate and it has a rounded annular projection 5a and a recess 5b at its forward end. A hollow portion 5c is formed therein, which receives the coil spring 6. There is a plurality of contact members (six members in the illustrated embodiment). Spring restraining member 7 is made of an electrical insulating material. Member 7 has positioning holes 7a at the upper and lower end parts thereof which are arranged to receive the positioning bosses 3c of the holding frame. Member 7 further has a plurality of spring restraining holes 7b (six holes in the illustrated embodiment) which are arranged in a line. The flexible printed circuit board 8 has pattern portions 8a and a pair of mounting holes 8b at its one end portion. The pair of mounting holes 8b are arranged to be positioned on a pair of projections 9a formed on the inside surface of said holding plate 9 at its one end portion. The flexible printed circuit board 8 is adhered to the holding plate 9 which is made of a metallic thin plate and the above described projections 9a are formed by die-forming. The holding plate 9 has engaging portions 9b and positioning holes 9c formed at the upper and lower sides of the one end portion thereof, which are arranged to engage with the engaging projections 3b and the positioning bosses 3c of the above-mentioned holding member 3. The holding plate 9 further has threaded holes 9d and positioning holes 9e formed at the upper and lower sides thereof. The threaded holes 9d are arranged to receive screws 10 (only one screw is shown in FIG. 1) to fixedly connect the holding plate 9 to the camera body 11 by said screws 10. The positioning holes 9e are arranged to receive positioning bosses 11a formed on the camera body 11.

In assembling the film information reading device as described above, firstly the contact holding member 4 is fitted at its contact holding part 4a into the opening 3a of the holding frame 3 and the contact members 5 are inserted into the six contact member holding holes 4b, respectively. Then, the spring restraining member 7 is attached to the holding frame 3 in such a manner that the positioning bosses 3c of the holding frame 3 and the positioning holes 7a of the spring restraining member 7 are aligned with each other. The coil springs 6 are inserted through the six spring restraining holes 7b of the spring restraining member 7 into the hollow portions 5c of the contact members 5, respectively. In the construction as illustrated in the drawings, the spring restraining member 7 is so arranged that the height of the member when attached is restrained by the holding frame 3 and the thickness of the member is larger than the pitch of the coil spring 6 so that the spring restraining member may not be caught by the coil spring. The length of the spring 6 is such that one end of the spring projects outwardly from the spring restraining hole 7b. The holding plate 9 with the flexible printed circuit board 8 attached thereto is connected to the holding frame 3 in such a manner that the positioning holes 9c come into engagement with the positioning bosses 3c of the holding frame 3. At this stage, the springs 6 are compressed and the engaging projections 3b of the holding frame 3 are pushed to a predetermined position, while making elastic deformation because of contact with the engaging portions 9b of the holding plate 9, until said projections 3b come into complete engagement with the engaging portions 9b. Thus, these element constitute a unit. This unit is mounted on the camera so that the holding frame 3 is fitted in to an opening portion 11b of the cartridge chamber formed in the camera body 11. The position of this unit relative to the camera body is determined by the engagement of the positioning bosses 11a of the camera body 11 with the positioning holes 9e of the holding plate 9 and the unit being fixedly connected to the camera body 11 by the screws 10 threaded into the holes 9d, whereby the unit is completely assembled with the camera body. FIG. 1 shows the completely assembled state.

In the assembled state shown in FIG. 1, the contact holding member 4 is slidable relative to the holding frame 3, and the contact members 5 are slidable relative to the contact holding member 4. The contact holding member 4 and the contact members 5 are energized by the springs 6 so that they are projected toward the center of the cartridge chamber of the camera body 11. One end of each of the springs 6 contacts the end surface of the hollow portion 5c of the contact member, and the radial position of the spring is determined by the contact member, with a predetermined gap being maintained therebetween. The other end of the spring is in contact with the information pattern portion 8a of the flexible printed circuit board 8 and is held by the rigid holding plate 9. Shifting of the spring in a radial direction is restrained by the action of the spring restraining hole 7b of the spring restraining member 7.

Figure 3:
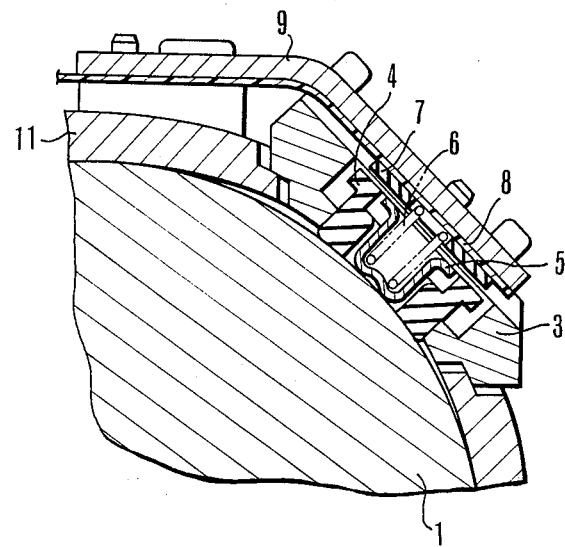
FIG. 3 is a sectional view showing the essential part of the film information reading device as shown in FIG. 1 in which a film cartridge has been loaded into the camera.
Figure 5:
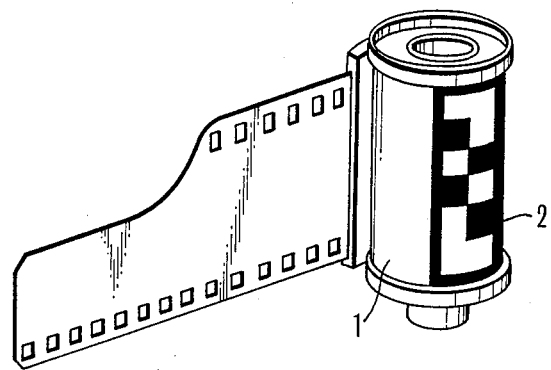
FIG. 5 is a perspective view of a film cartridge having the film information pattern formed on the outside peripheral surface thereof, which constitutes the subject of the film information reading device according to the present invention.

In the state as shown in FIG. 3 where the film cartridge 1 as shown in FIG. 5 has been loaded into the cartridge chamber of the camera body 11, the contact members 5 are pressed by the film information pattern 2 formed on the peripheral portion of the film cartridge 1 into the camera body against the action of the energizing force of the springs 6. At this stage, the contact holding member 4, which serves to restrain the projecting amount of the contact members 5 at the time when the film cartridge has not yet been loaded into the camera as shown in FIG. 1, functions to prevent catching of the contact member at the time when the film cartridge is being loaded into the camera body. Thus, the contact holding member 4 and the contact members 5 are pressed into the camera body until they come into contact with the spring restraining member 7. This features allows for the spring restraining member 7 serves to prevent the contact holding member and the contact members from making direct contact with the flexible printed circuit board 8 and thus prevents the danger of causing damage of the flexible printed circuit board or the like because such direct contact is avoided. Furthermore, the spring restraining holes 7b of the spring restraining member 7 have the effect of restraining the shifting of the ends of the springs 6 contacting the information pattern portion 8a, so that the reliability of electrical conduction and the reliability of the movement of the contact members are improved. The electrical conductive path is formed from the film information pattern 2 through the contact members 5 and the springs 6 to the information pattern portions 8a, whereby the required film information signals are transmitted from the film information pattern to the pattern portions of the flexible printed circuit board.

Figure 2A:
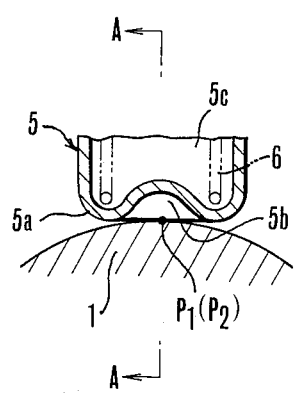
Figure 2B:
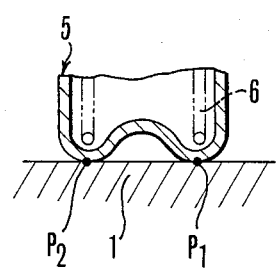

The contact member 5 and the portion of the film information pattern 2 of the film cartridge 1 make contact with each other in the state as shown in FIGS. 2a and 2b, where the spring 6 contacts the inside surface of the annular projection 5a at the forward end of the contact member 6 and said annular projection 5a makes two-point contact with the film information pattern 2 at contact points P1 and P2. Accordingly, in the construction in which the contact member 5 is loosely fitted into the hole of the contact holding part 4a of contact holding member 4, the two-point contact at the points P1 and P2 is assured at any time even if there is some error causing factor, such as tilting of the film cartridge. Furthermore, the rounded shape of the annular projection 5a of the contact member 5 is effective to improve the reliability of signal transmission, without the danger of causing damage of the film information pattern 2 of the film cartridge.

As explained above, the present invention provides a film information reading device in which the contact member is formed, at its contact end portion, with the annular projection, which enables the forming of two-point contact with one film information pattern of the film cartridge and further enables a decrease in the pitch to the two contact points, whereby the allowance relating to the positional shifting of the contact member is increased. The film information reading device is very reliable and can be manufactured with simple construction and at low cost. Furthermore, the present invention provides for a film information reading device in which the spring restraining member arranged in front of the flexible printed circuit board is effective to prevent the pattern portion of the flexible printed circuit board from being damaged by the contact member and prevents the occurrence of positional shifting of the end of the coil spring. This assures good electrical conduction, smooth movement of the contact member, and easy, and reliable assemblying of the device.

I claim:

1. A film information reading device comprising at least one contact member arranged to make contact with a film information pattern formed on an outside peripheral surface of a film cartridge to read out the film information pattern, in which:
    (a) said contact member is formed as a cap-shaped member having a contact surface arranged to make contact with said film information pattern, said contact surface having a projection at its end surface, whereby said projection is formed in the shape of an annular projection; and
    (b) a spring member is arranged to cause the contact surface of said contact member to make contact with said film information pattern.

2. A film information reading device according to claim 1, in which said contact member is inserted in an opening formed in a wall of a film cartridge chamber and slidable therein.

3. A film information reading device according to claim 2, in which said spring member makes contact, at its one end, with said contact member and, at its other end, with a pattern portion of a flexible printed circuit board.

4. A film information reading device comprising at least one contact member arranged to make contact with a film information pattern formed on an outside peripheral surface of a film cartridge to read out the film information pattern, in which:
    (a) said contact member is formed as a cap-shaped member movable between a first position where the contact member projects by a predetermined amount from an opening formed in a wall of a film cartridge chamber and a second position where the contact member is retracted from the first position into the wall of the film cartridge chamber;
    (b) a spring member is inserted at its one part into said contact member and projects at its other part from the cap-shaped contact member, said contact member being moved to said first position by the action of spring force of said spring member and moved to said second position against the action of spring force by contact with the outside peripheral surface of the film cartridge loaded into the film cartridge chamber; and
    (c) a circuit board having a conductive pattern is arranged to be contacted with an end surface of said other part of said spring member,
    said cap-shaped contact member being formed in the shape of an annular projection at its contact surface with the film cartridge.

5. A film information reading device according to claim 4, comprising a plurality of said contact members.

6. A film information reading device comprising at least one contact member arranged to make contact with a film information pattern formed on an outside peripheral surface of a film cartridge to read out the film information pattern, in which:
    (a) said contact member is formed in a cap-shaped member movable between a first position where said contact member projects to a predetermined amount from an opening formed in a wall of a film cartridge chamber and a second position where said contact member is retracted from the first position into the wall of the film cartridge chamber;
    (b) a spring member is inserted at its one part into said contact member and projects at its other part from said cap-shaped contact member, said contact member being moved to said first position by the action of spring force of said spring member and moved to said second position against the action of spring force by contact with the outside peripheral surface of the film cartridge loaded into the film cartridge chamber;
    (c) a circuit board having a conductive pattern is arranged to be contacted by an end surface of said other part of said spring member;
    (d) a contact preventing member is disposed between said cap-shaped contact member and said circuit board,
    said contact preventing member being arranged to prevent said contact member from making contact with said circuit board when said contact member is moved toward the second position.

7. A film information reading device according to claim 6, in which said circuit board is a flexible printed circuit board.

8. A film information reading device according to claim 7, in which said contact preventing member is made of an insulating material.

9. A film information reading device according to claim 6, in which said contact preventing member has an opening through which said spring member passes and the contact member and the circuit board are electrically connected together through said spring member.

10. A film information reading device according to claim 1, wherein the contact surface of said cap-shaped member has a uniform well thickness.

11. A film information reading device comprising at least one contact member arranged to make contact with a film information pattern formed on an outside peripheral surface of a film cartridge to read out the film information pattern, in which:
- (a) said contact member is formed in a cap-shaped member movable between a first position where the contact member projects to a predetermined amount from an opening formed in a wall of a film cartridge chamber and a second position where said contact member is retracted from the first position into the wall of the film cartridge chamber;
- (b) a spring member is inserted at its one part into said contact member and projects at its other part from the cap-shaped contact member, said contact member being moved to said first position by the action of spring force of said spring member and moved to said second position against the action of spring force by contact with the outside peripheral surface of the film cartridge loaded into the film cartridge chamber;
- (c) a circuit board having a conductive pattern is arranged to make contact with an end surface of said other part of the spring member; and
- (d) a contact preventing member is disposed between said cap-shaped contact member and the circuit board, said contact preventing member being arranged to prevent said contact member from making contact with the circuit board when the contact member is moved toward the second position.

12. A film information reading device according to claim 11, in which said contact preventing member has an opening through which said spring member passes and said contact member and the circuit board are electrically connected together through said spring member.

13. A film information reading device including at least one contact member arranged to make contact with a film information pattern formed on an outside peripheral surface of a film cartridge to read out the film information pattern, in which:
- (a) said contact member is formed as a cap-shaped member having a contact surface arranged to make contact with said film information pattern, said contact surface having the shape of an annular projection and having a uniform wall thickness, and
- (b) a spring member is arranged inside of said cap-shaped contact member to cause the contact surface of said contact member to make contact with said film information pattern.

* * * * *

UNITED STATES PATENT AND TRADEMARK OFFICE
CERTIFICATE OF CORRECTION

PATENT NO. : 4,783,671
DATED : November 8, 1988
INVENTOR(S) : Haraguchi

It is certified that error appears in the above-identified patent and that said Letters Patent is hereby corrected as shown below:

COLUMN 4:

Line 47, "features" should read --feature--.

COLUMN 6:

Line 27, "to" should read --by--;

Line 44, "member;" should read --member; and--;

Line 66, "well thickness." should read --wall thickness.--.

COLUMN 7:

Line 6, "to" should read --by--.

UNITED STATES PATENT AND TRADEMARK OFFICE
CERTIFICATE OF CORRECTION

PATENT NO. : 4,783,671

DATED : November 8, 1988

INVENTOR(S) : Haraguchi

It is certified that error appears in the above-identified patent and that said Letters Patent is hereby corrected as shown below:

COLUMN 8

Line 19, "thickness," should read --thickness;--.

Signed and Sealed this

Twenty-fourth Day of October, 1989

Attest:

DONALD J. QUIGG

*Attesting Officer*  *Commissioner of Patents and Trademarks*